(12) United States Patent
Chen et al.

(10) Patent No.: US 7,371,088 B2
(45) Date of Patent: May 13, 2008

(54) CHIP CARD RETAINING MECHANISM

(75) Inventors: Rui-Hao Chen, Shenzhen (CN);
Hsiao-Hua Tu, Taipei Hsien (TW);
Chia-Hua Chen, Taipei Hsien (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/559,818

(22) Filed: Nov. 14, 2006

(65) Prior Publication Data
US 2007/0167080 A1 Jul. 19, 2007

(30) Foreign Application Priority Data
Jan. 14, 2006 (CN) .................. 2006 1 0032950

(51) Int. Cl.
*H01R 13/62* (2006.01)
(52) U.S. Cl. ...................................... 439/159; 439/630

(58) Field of Classification Search ................ 439/159, 439/155, 152–153, 923, 327, 630
See application file for complete search history.

(56) References Cited

U.S. PATENT DOCUMENTS
6,712,627 B2 * 3/2004 Murnaghan et al. ........ 439/159

* cited by examiner

*Primary Examiner*—Javaid H. Nasri
(74) *Attorney, Agent, or Firm*—Jeffrey T. Knapp

(57) ABSTRACT

A chip card retaining mechanism for retaining a chip card is mounted in an electronic device. The electronic device includes a housing (20). The housing defines a battery compartment (22) and a cavity (23). The chip card retaining mechanism includes a base (24) and an elastic member (30). The base is formed in the cavity. The base and the housing cooperatively define a receiving space (206) for receiving the chip card. The base has a resisting portion formed at one end thereof and adjacent to the battery compartment. The elastic member is installed in the housing. Upon being received in the receiving space, the chip card is resiliently held between the elastic member and the resisting portion.

15 Claims, 6 Drawing Sheets

CHIP CARD RETAINING MECHANISM

BACKGROUND OF THE INVENTION

1. Field of the Invention

The present invention generally relates to chip card retaining mechanisms and, more particularly, to a chip card retaining mechanism for seating a chip card in an electronic device such as a mobile phone.

2. Description of Related Art

Nowadays, electronic devices such as mobile phones are widely used and bring convenience to our lives, and as such, electronic devices have become a part of modern life. Every electronic device has a chip card such as a SIM (subscriber identification module) card for carrying information necessary for operating the mobile phone. The chip card may also contain information specific to the subscriber, for example, a listing of frequently used telephone numbers. However, it is essential to provide a chip card retaining mechanism to hold the chip card in the electronic device and thus ensure safe information transfer.

Referring to FIG. 6, a typical chip card retaining mechanism used in a mobile phone is as follows. The chip card retaining mechanism includes a mounting base 92 and a locking element 94. A receiving recess 921 is defined in the mounting base 92 and is configured (i.e., structured and arranged) for receiving a chip card. A connector 90 is disposed in the receiving recess 921. The locking element 94 is mounted on the mounting base 92 and located adjacent to the receiving recess 921. The locking element 94 can move in a direction shown by an arrow. In assembly, the locking element 94 is pushed away from the receiving recess 921 to completely expose the receiving recess 921. The chip card is received in the receiving recess 921, and the locking element 94 is pushed toward the receiving recess 921 to cover a portion of the receiving recess 921 so that the chip card cannot be removed from the receiving recess 921.

That the locking element 94 can be easily moved to allow insertion and locking of the chip card can prove problematic when a mobile phone inadvertently undergoes impact. This impact may result in an outer force that removes the locking element 94 from the receiving recess 921, which can, at a minimum, result in an ineffective electrical connection between the chip card and the connector 90. At worst, the chip card may become completely separated from the receiving recess 921.

What is needed, therefore, is a chip card retaining mechanism, which can overcome the above-described shortcomings.

SUMMARY OF THE INVENTION

In a first preferred embodiment, a chip card retaining mechanism for retaining a chip card mounted in an electronic device. The electronic device includes a housing. The housing defines a battery compartment and a cavity. The chip card retaining mechanism includes a base and an elastic member. The base is formed in the cavity. The base and the housing cooperatively define a receiving space configured for receiving a chip card. The base has a resisting portion formed at one end thereof and adjacent to the battery compartment. The elastic member is installed on the housing. If the chip card is received in the receiving space, the chip card is held between the elastic member and the resisting portion.

Other advantages and novel features of the preferred embodiments of the present chip card retaining mechanism and its applications will become more apparent from the following detailed description when taken in conjunction with the accompanying drawings.

BRIEF DESCRIPTION OF THE DRAWINGS

Many aspects of the present chip card retaining mechanisms and their applications can be better understood with reference to the following drawings. The components in the drawings are not necessarily drawn to scale, the emphasis instead being placed upon clearly illustrating the principles of the chip card retaining mechanisms. Moreover, in the drawings, like reference numerals designate corresponding parts throughout the several views.

DETAILED DESCRIPTION OF THE INVENTION

Figure 1:
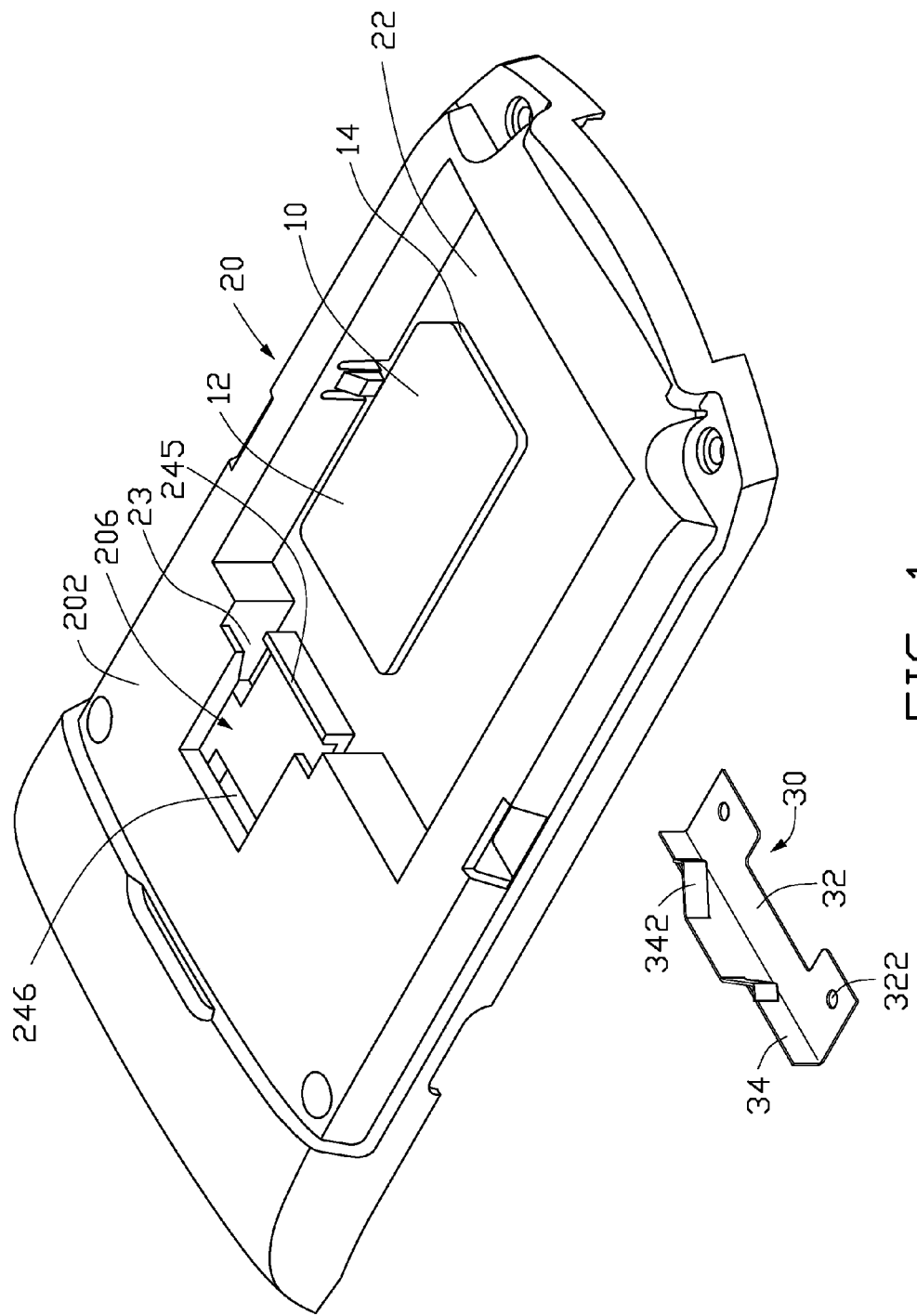
FIG. 1 is an exploded, isometric view of a chip card retaining mechanism, in accordance with a first preferred embodiment.

A chip card retaining mechanism is adapted/designed for retaining a chip card in an electronic device such that the chip card is electronically connected with a connector in the electronic device. Referring to FIG. 1, the chip card retaining mechanism is incorporated within an exemplary mobile phone, which includes a housing 20. In order to identify the mobile phone, when communicating, a chip card 10, such as a subscriber identification module, also called a SIM-card, is provided.

Figure 2:
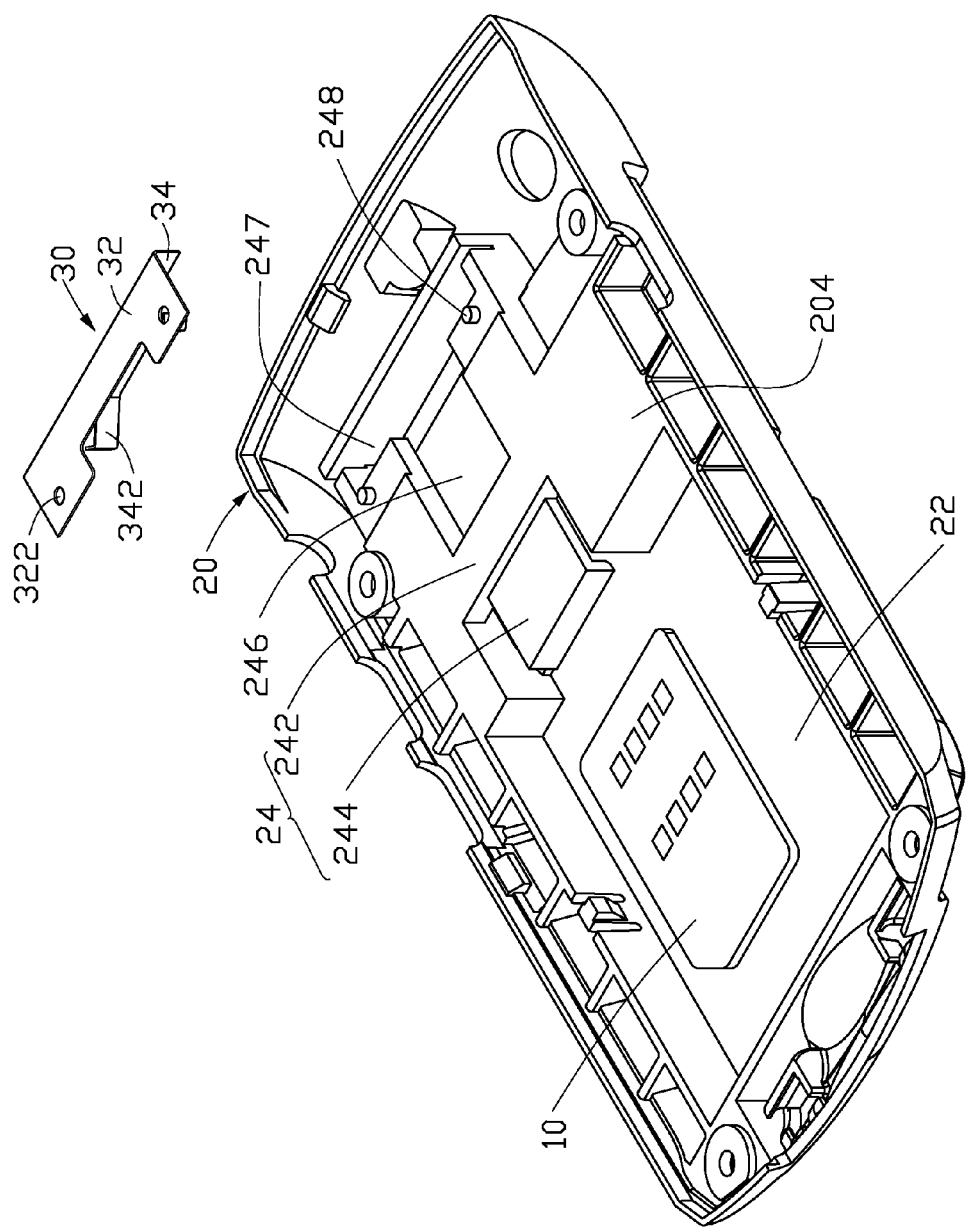
FIG. 2 is similar to FIG. 1, but from another aspect.

Referring also to FIG. 2 the chip card retaining mechanism includes a base 24 and an elastic member 30. The base 24 is formed within the housing 20.

The housing 20 is a rear cover of the mobile phone. The housing 20 has a battery compartment 22 defined therein. The battery compartment 22 is configured for receiving a battery (not shown). The housing 20 has a front surface 202 and a rear surface 204. The housing 20 has a cavity 23 defined adjacent to the battery compartment 22. The cavity 23 extends through the front surface 202 and the rear surface 204. The base 24 adjoins the rear surface 204 and is located in the cavity 23.

The base 24 includes a cross beam 242 and a latching/catch mechanism 244. The latching mechanism 244 extends from a side of the cross beam 242 toward the battery compartment 22. The cross beam 242 spans across the cavity 23. A first surface of the base 24 is lower than the front surface 202 of the housing 20, thus forming a receiving space 206 between the base 24 and a front surface 202 of the housing 20. The receiving space 206 is configured for receiving and retaining the chip card 10. The latching mechanism 244 has an L-shaped cross-section. One end of the latching mechanism 244 connects the cross beam 242, and the other end of the latching mechanism 244 is provided with a resisting portion 245, adjacent to the battery compartment 22. The latching mechanism 244 is sufficiently elastic and resilient to facilitate the functioning thereof as a latch (e.g., snap-fit capability). The housing 20 defines a latching recess 246 adjacent to the cross beam 242 and configured for receiving a chip card connector. The latching recess 246 is defined in the rear surface 202 of the housing 20 and communicates with the cavity 23. The housing 20 has an inserting slot 247 adjacent to the latching recess 246. The inserting slot 247 is defined in the rear surface 204 of the housing 20. The inserting slot 247 is configured (i.e., structured and arranged) for receiving the elastic member 30. The housing 20 has two positioning pins 248 for positioning the elastic member 30.

The elastic member 30 is formed by punching and bending a band-shaped thin metal plate using a pressing machine or the like. The elastic member 30 includes a securing portion 32 and a locking portion 34. The locking portion 34 vertically extends from the securing portion 32. The securing portion 32 has two positioning holes 322 defined at two opposite ends thereof. These two positioning holes 322 are configured for respectively engaging around the corresponding positioning pins 248 of the housing 20. Two elastic arms 342 extend from one side of the locking portion 34.

Figure 3:
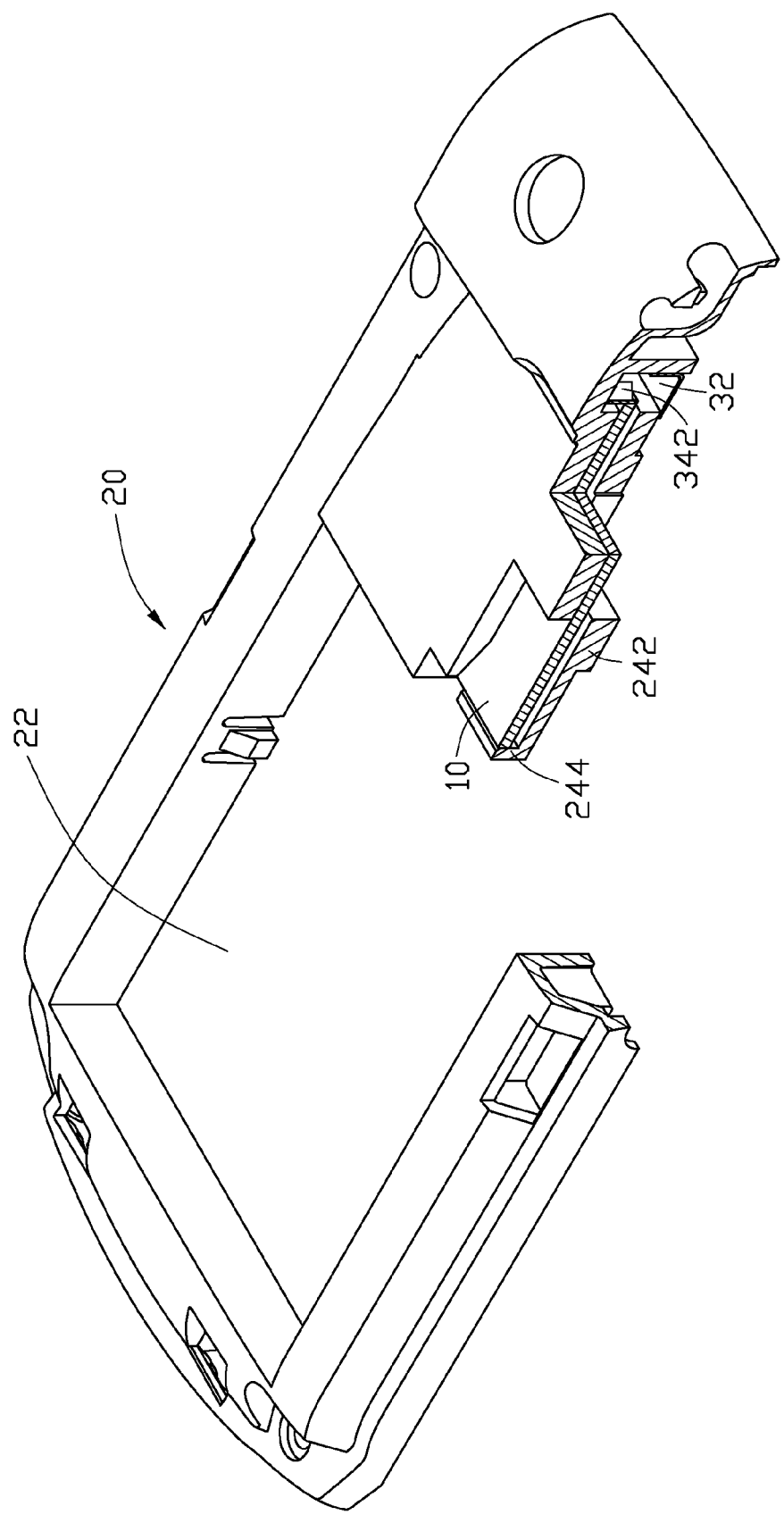
FIG. 3 is an assembled, isometric view of the chip card retaining mechanism of FIG. 1.

Referring also to FIG. 3, in assembly, the locking portion 34 of the elastic member 30 is inserted into the inserting slot 247 of the housing 20. Accordingly, the elastic arms 342 extend into the receiving space 206 of the housing 20 and the positioning holes 322 engage around the positioning pins 248 of the housing 20. The positioning pins 248 are securely engaged with the positioning holes 322, advantageously, by melting/welding or soldering. The elastic member 30 is thus secured to the housing 20.

In assembling and mounting the chip card 10, a first end 12 of the chip card 10 is slantingly inserted into the receiving space 206. When the first end 12 of the chip card 10 abuts the elastic arms 342 of the elastic member 30, the chip card 10 is continuously pushed, with the chip card 10 compressing the elastic arms 342. Thus, the elastic arms 342 are elastically/resiliently deformed and accumulate elastic force. When the chip card 10 is completely received in the receiving space 206, an opposite second end 14 of the chip card 10 resiliently abuts the resisting portion 245 of the latching mechanism 244, and, of course, the pushing action can be stopped. Thus, the chip card 10 is stably locked in the receiving space 206 by the elastic member 30 and the latching mechanism 244. Thus, when locked (i.e., resiliently held) in this manner, the chip card 10 cannot become accidentally separated from the housing 20 and, specifically, the receiving space 206. Therefore, an effective electrical connection between the chip card 10 and the chip card connector is provided and ensured.

When removing the chip card 10, the resisting portion 245 of the latching mechanism 244 is pressed downward and thereby deformed. When a deformation of the latching mechanism 244 exceeds a thickness of the chip card 10, the elastic arms 342 of the elastic member 30 can push out of the chip card 10. As such, the chip card 10 can be readily gripped and removed from the base housing 20.

Figure 4:
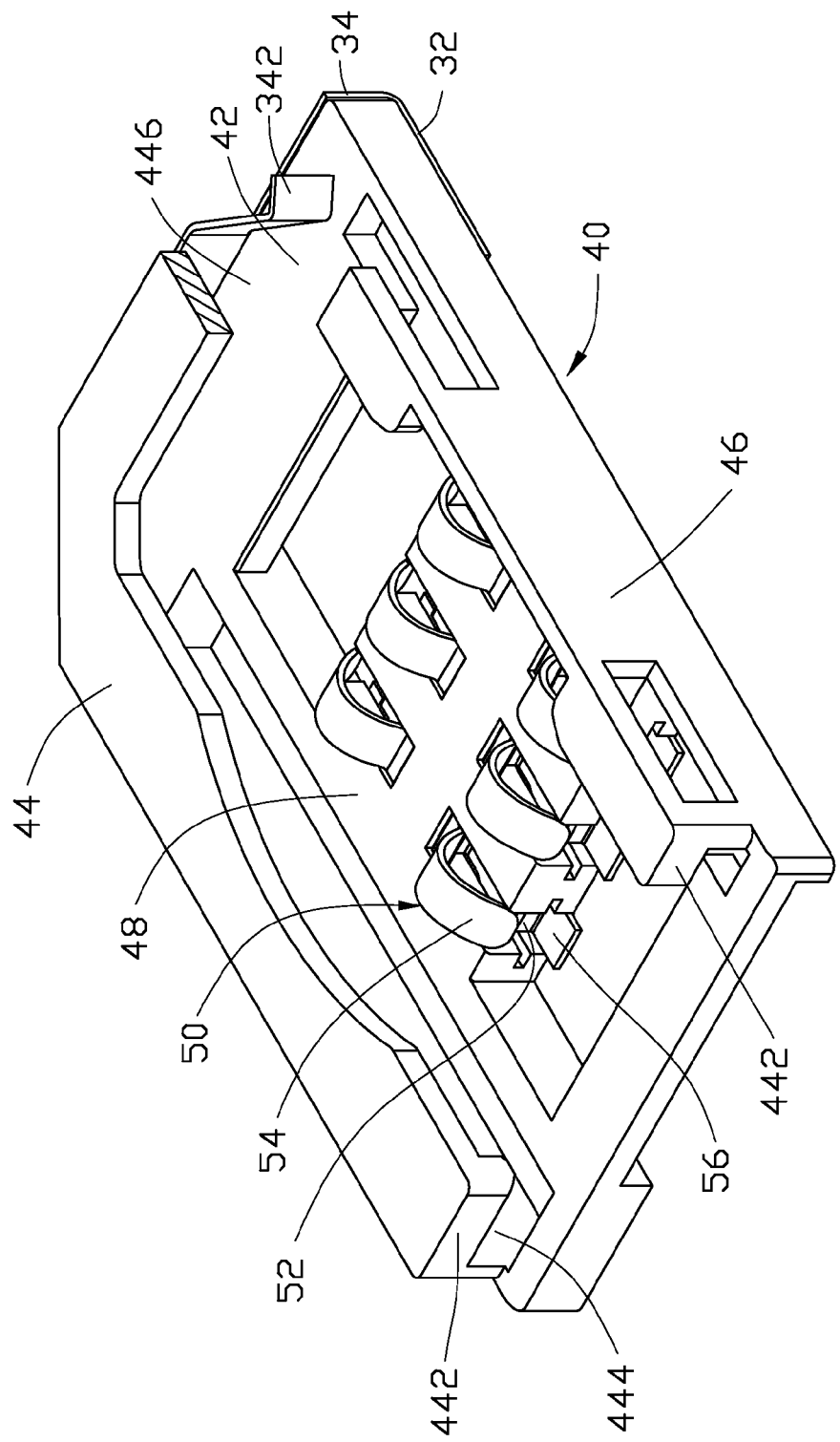
FIG. 4 is an exploded, isometric view of a chip card retaining mechanism, in accordance with a second preferred embodiment.
Figure 5:
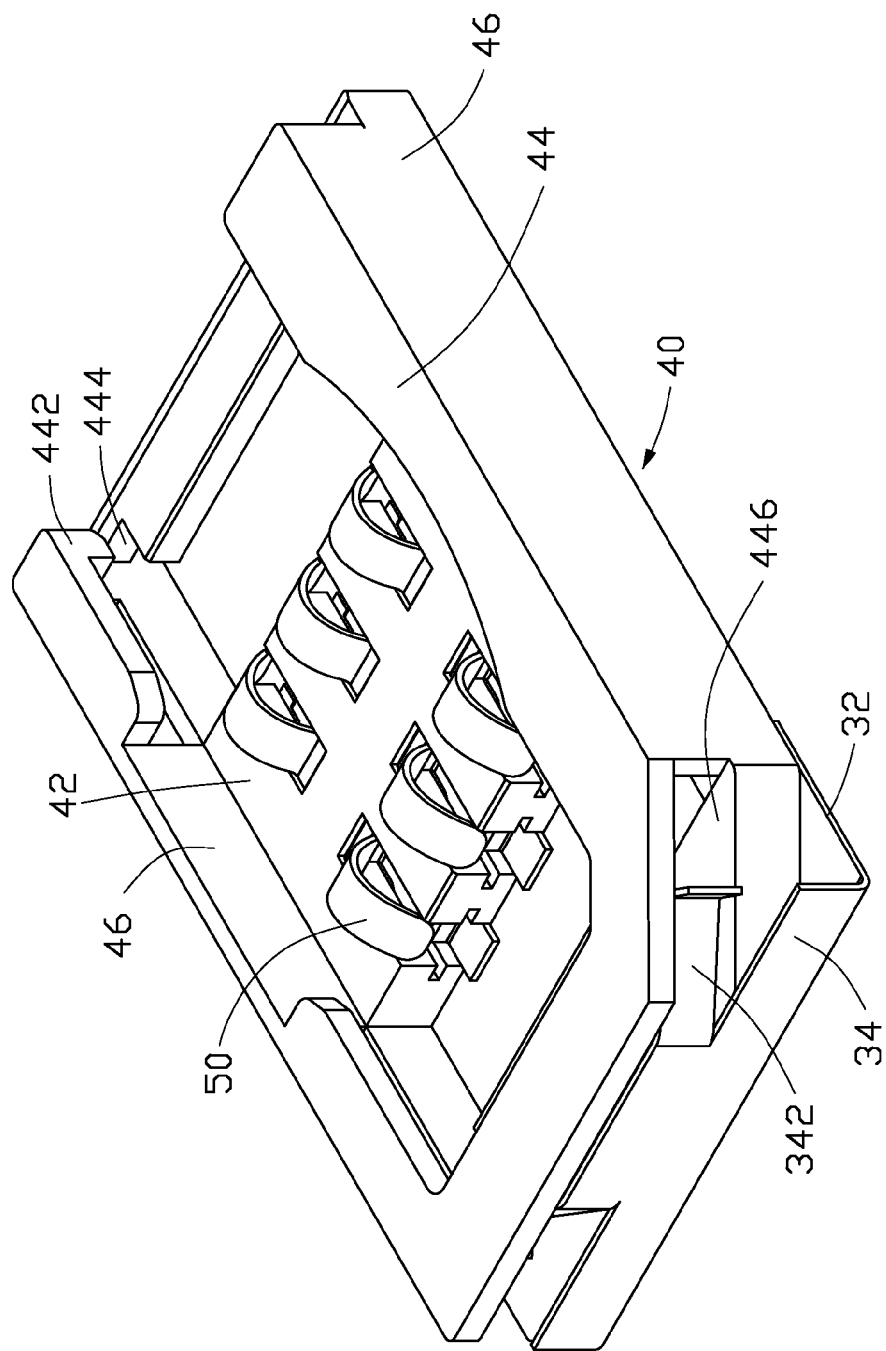
FIG. 5 is similar to FIG. 4, but showing another aspect.
Figure 6:
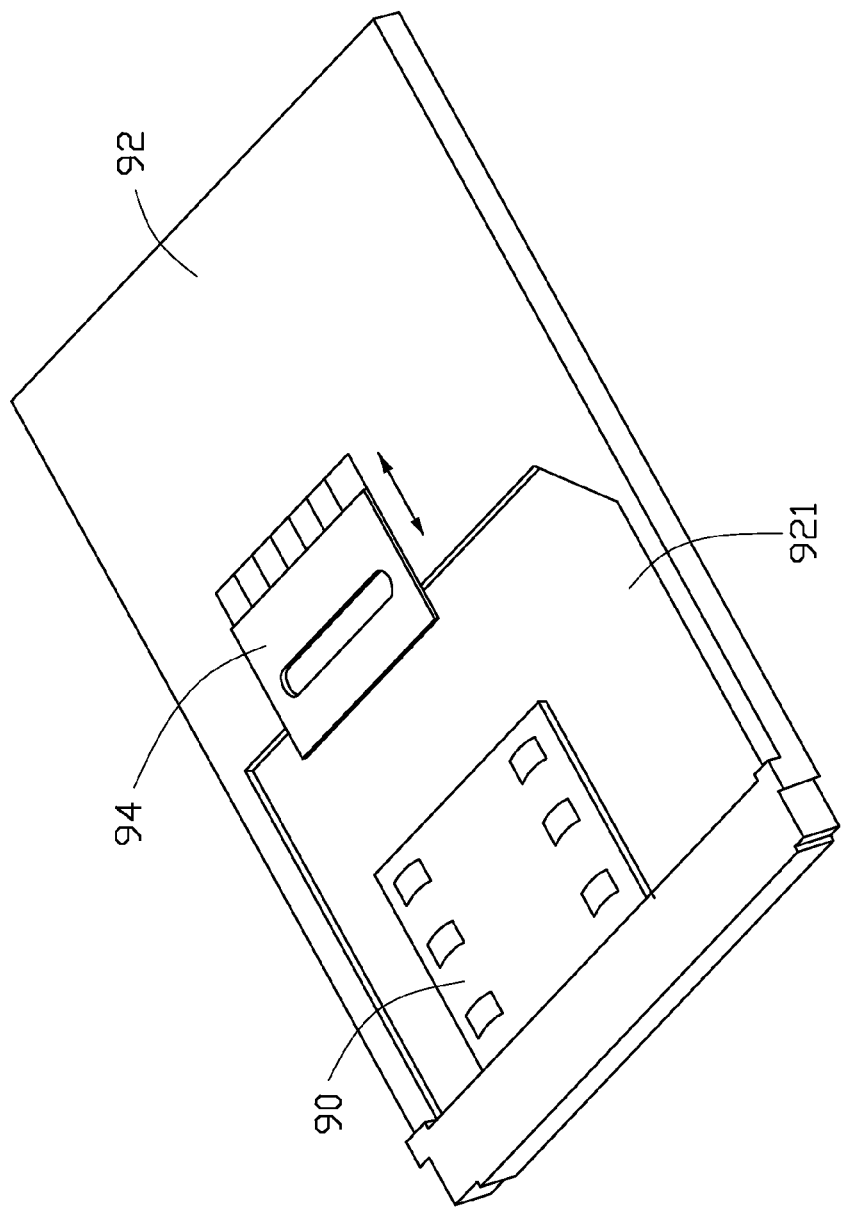
FIG. 6 is an exploded, isometric view of a typical chip card retaining mechanism.

Referring to FIGS. 4 and 5, a chip card retaining mechanism is provided, according to a second preferred embodiment. The chip card mechanism includes the elastic member 30, a base 40, and a plurality of contact terminals 50. The base 40 is substantially rectangular. The base 40 includes a bottom wall 42, a top wall 44, and two sidewalls 46. The bottom wall 42, the top wall 44, and the two sidewalls 46 cooperatively form a receiving space 48 configured for receiving the chip card 10. The bottom 42 defines a plurality of terminal slots (not shown). The top wall 44 is substantially U-shaped. When the chip card 10 is inserted into the base 40, a first surface of the chip card 10 is exposed through the top wall 44. The base 40 has a latching/catch mechanism at one end thereof. The latching/catch mechanism includes two protruding blocks 442 that respectively vertically extend from the top wall 44 and a corresponding sidewall 46. A gap 444, of greater size than a width of the chip card 10, is defined between the protruding blocks 442 and the bottom wall 42 of the base 40 and is located at a first end of the base 40. An opening 446 is established between the bottom wall 42 and the top wall 44 and situated at a second end of the base 40.

Each contact terminal 50 is formed by punching and bending a band-shaped thin metal plate using a pressing machine or the like. Each contact terminal 50 includes a securing portion 52, an elastic contact 54 bending upward from the securing portion 52, and a welding contact 56 bending downward from the securing portion 52. Each contact terminal 50 is retained in a corresponding terminal slot, floatingly protruding from a first surface of the bottom wall 42 of the base 40. The welding contact 56 projects out from a second surface of the bottom wall 42. The welding contact 56 is welded/soldered (hence, the name of the contact) to the printed circuit board (not labeled) of the mobile phone.

In assembly, each contact terminal 50 is retained in a corresponding terminal slot, floatingly protruding from a first surface of the bottom wall 42 of the base 40. Meanwhile, the welding contact 56 projects out from a second surface of the bottom wall 42. The elastic member 30 is disposed at the base 40, opposite to the protruding blocks 442. The securing portion 32 of the elastic member 30 is attached to the bottom wall 42, beneficially, by melting/welding or soldering, with the elastic arms 342 extending into the receiving space 48 via the opening 446. The elastic member 30 is thus secured to the base 40.

In assembling and mounting the chip card 10, the chip card 10 is aligned with the gap 444 and pushed into the receiving space 48 of the base 40. The chip card 10 proceeds, under the pushing force, into the receiving space 48 and slides in the receiving space 48, guided by the sidewalls 46 of the base 40. When the chip card 10 impinges upon the elastic contacts 54 of the contact terminals 50, the chip card 10 continues toward the elastic member 30, with the chip card 10 compressing the elastic contacts 54. Thus, the elastic contacts 54 are elastically deformed and accumulate elastic force. When the chip card 10 abuts the elastic arms 342 of the elastic member 30, the chip card 10 compresses the elastic arms 342. Thus, the elastic arms 342 are also elastically/resiliently deformed and accumulate elastic force. When the chip card 10 is completely received in the receiving space 48, the chip card 10 need no longer be pushed, and the chip card 10 is lifted up by an elastic force of the elastic contacts 54 of the contact terminals 50, as a result of the elastic force of the elastic arms 342 of the elastic member 30. Upon being completely received in the receiving space 48, the opposite second end 14 of the chip card 10 abuts the latching portions 442 of the base 40. Thus, the chip card 10 is stably locked in the receiving space 48 and retained between the protruding blocks 442 and the elastic arms 342 of the elastic member 30. As a result of being locked (i.e., resiliently held) in place, the chip card 10 cannot become accidentally separated from the receiving space 48. Therefore, an assured, effective electrical connection between the chip card 10 and the conduct terminals 50 is provided.

When removing the chip card 10, the chip card 10 is pressed downward to align with the gap 444 and thus out of range of the protruding blocks 442. The chip card 10 is then pushed out of the receiving space 48, under of the elastic force of the elastic arms 342 of the elastic member 30 (i.e., the elastic arms 342 serve as an automatic ejection means). As such, the chip card 10 can then be easily gripped and removed from the base 40.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A chip card retaining mechanism for retaining a chip card mounted in an electronic device, the electronic device including a housing, the housing defining a battery compartment and a cavity, the chip card retaining mechanism comprising:
    a base established within the housing and located in the cavity, the base and the housing cooperatively defining a receiving space, the receiving space being configured for receiving and retaining a chip card, the base having a latching mechanism formed at one end thereof, the latching mechanism being adjacent to the battery compartment; and
    an elastic member installed in the housing;
    wherein the elastic member and the latching mechanism together are structured and arranged such that, when the chip card is received in the receiving space, a first end of the chip card resists the elastic member and an opposite second end of the chip card resists the latching mechanism; and
    further wherein the elastic member is configured such that, when the chip card is removed from the receiving space, the elastic member automatically pushes the chip card out of the receiving space.

2. The chip card retaining mechanism as claimed in claim 1, wherein the elastic member includes a securing portion, the securing portion being attached to the housing.

3. The chip card retaining mechanism as claimed in claim 2, wherein the securing portion defines two positioning holes, and the housing has two positioning pins configured for engaging with the positioning holes.

4. The chip card retaining mechanism as claimed in claim 2, wherein the elastic member further includes a locking portion, the locking portion vertically extending from the securing portion, the housing defining an inserting slot configured for receiving the locking portion.

5. The chip card retaining mechanism as claimed in claim 4, wherein the elastic member further includes two elastic arms extending from the locking portion and extending into the receiving space, the elastic arms being configured for impinging upon the chip card.

6. The chip card retaining mechanism as claimed in claim 1, wherein the base includes a cross beam spanning across the cavity, the latching mechanism extending from the cross beam, a resisting portion being formed at one end of the latching mechanism.

7. The chip card retaining mechanism as claimed in claim 6, wherein the latching mechanism has an L-shaped cross-section, one end of the latching mechanism connects the cross beam, and the other end of the latching mechanism is provided with a resisting portion for resisting the chip card.

8. The chip card retaining mechanism as claimed in claim 1, further comprising a plurality of terminals retained in the base, wherein the terminals having elastic contacts protruding from a first surface of the base, the elastic contacts being configured for elastically abutting the chip card.

9. The chip card retaining mechanism as claimed in claim 8, wherein the elastic member includes a securing portion, and the securing portion is secured in the base.

10. The chip card retaining mechanism as claimed in claim 9, wherein the elastic member further includes a locking portion and two elastic arms extending from the locking portion, each elastic arm being configured for resiliently abutting the chip card.

11. The chip card retaining mechanism as claimed in claim 8, wherein the base includes a bottom wall, a top wall, and two opposing sidewalls, the bottom wall defining a plurality of terminal slots for receiving the terminals.

12. The chip card retaining mechanism as claimed in claim 11, wherein the latching mechanism includes two protruding blocks, each protruding block extends from the top wall, and a gap is defined between the bottom wall and the protruding, the gap being structured and arranged for facilitating an insertion of the chip card thereinto.

13. The chip card retaining mechanism as claimed in claim 11, wherein an opening is defined at the other end of the base between the top wall and the bottom wall, the elastic member being disposed in the opening.

14. The chip card retaining mechanism as claimed in claim 11, wherein the top wall is substantially U-shaped.

15. The chip card retaining mechanism as claimed in claim 1, wherein the receiving space is formed between a first surface of the base and a front surface of the housing, and the first surface of the base is lower than the front surface of the housing.

* * * * *